United States Patent
Wu et al.

(10) Patent No.: US 12,552,872 B2
(45) Date of Patent: Feb. 17, 2026

(54) HUMANIZED BCMA ANTIBODY AND BCMA-CAR-T CELLS

(71) Applicants: ProMab Biotechnologies, Inc., Richmond, CA (US); Forevertek Biotechnology Co., Ltd, Changsha (CN)

(72) Inventors: Lijun Wu, Berkeley, CA (US); Vita Golubovskaya, Pinole, CA (US)

(73) Assignees: ProMab Biotechnologies, Inc., Richmond, CA (US); Forevertek Biotechnology Co., Ltd, Changsha (CN)

( * ) Notice: Subject to any disclaimer, the term of this patent is extended or adjusted under 35 U.S.C. 154(b) by 878 days.

(21) Appl. No.: 17/849,399

(22) Filed: Jun. 24, 2022

(65) Prior Publication Data
US 2022/0356262 A1    Nov. 10, 2022

Related U.S. Application Data

(63) Continuation of application No. PCT/US2020/066332, filed on Dec. 21, 2020.

(60) Provisional application No. 62/953,808, filed on Dec. 26, 2019.

(51) Int. Cl.
| | |
|---|---|
| *C07K 16/28* | (2006.01) |
| *A61K 39/00* | (2006.01) |
| *A61K 40/11* | (2025.01) |
| *A61K 40/31* | (2025.01) |
| *A61K 40/42* | (2025.01) |
| *C07K 14/705* | (2006.01) |
| *C07K 14/725* | (2006.01) |
| *C12N 5/0783* | (2010.01) |

(52) U.S. Cl.
CPC .......... *C07K 16/2878* (2013.01); *A61K 40/11* (2025.01); *A61K 40/31* (2025.01); *A61K 40/4215* (2025.01); *C07K 14/7051* (2013.01); *C07K 14/70578* (2013.01); *C12N 5/0636* (2013.01); *C12N 5/0646* (2013.01); *A61K 2039/505* (2013.01); *A61K 2239/31* (2023.05); *A61K 2239/38* (2023.05); *A61K 2239/46* (2023.05); *C07K 2317/24* (2013.01); *C07K 2317/622* (2013.01); *C07K 2319/03* (2013.01); *C07K 2319/33* (2013.01)

(58) Field of Classification Search
None
See application file for complete search history.

(56) References Cited

U.S. PATENT DOCUMENTS
2014/0335091 A1    11/2014    Forgie et al.

FOREIGN PATENT DOCUMENTS
| | | |
|---|---|---|
| WO | 2018127787 A1 | 7/2018 |
| WO | 2019195017 A1 | 10/2019 |

OTHER PUBLICATIONS

Rudikoff, et al., PNAS, 1982, 79, 1979-1983 (Year: 1982).*
Ahmad, et al., Clin Dev Immunol, 2012, 980250, 1-15 (Year: 2012).*
Janeway, et. al., Immunobiology: The Immune System in Health and Disease, 5th edition, 2001 (Year: 2001).*
International Search Report for PCT Application No. PCT/US2020/066552. Mail Date: Mar. 18, 2021. 3 pages.

* cited by examiner

*Primary Examiner* — Michael Szperka
*Assistant Examiner* — Samantha Lake Hopkins
(74) *Attorney, Agent, or Firm* — Perkins Coie LLP; Viola Kung

(57) ABSTRACT

The present invention is directed to a humanized BCMA single-chain variable fragment (scFv), comprising $V_H$ having the amino acid sequence of SEQ ID NO: 4 and $V_L$ having the amino acid sequence of SEQ ID NO: 5. The present invention is also directed to a BCMA chimeric antigen receptor fusion protein comprising from N-terminus to C-terminus: (i) a single-chain variable fragment (scFv) of the present invention, (ii) a transmembrane domain, (iii) at least one co-stimulatory domains, and (iv) an activating domain. This humanized BCMA-CAR-T cells have specific killing activity with secretion of cytokine IFN-gamma in CAR-T cells in vitro and in vivo.

12 Claims, 4 Drawing Sheets

Specification includes a Sequence Listing.

```
         10         20         30         40         50
MLQMAGQCSQ NEYFDSLLHA CIPCQLRCSS NTPPLTCQRY CNASVTNSVK
         60         70         80         90        100
GTNAILWTCL GLSLIISLAV FVLMFLLRKI NSEPLKDEFK NTGSGLLGMA
        110        120        130        140        150
NIDLEKSRTG DEIILPRGLE YTVEECTCED CIKSKPKVDS DHCFPLPAME
        160        170        180
EGATILVTTK TNDYCKSLPA ALSATEIEKS ISAR
```

HUMANIZED BCMA ANTIBODY AND BCMA-CAR-T CELLS

This application is a continuation of PCT/US2020/066332, filed Dec. 21, 2020; which claims the priority of U.S. Provisional Application No. 62/953,808, filed Dec. 26, 2019. The contents of the above-identified applications are incorporated herein by reference in their entireties.

REFERENCE TO SEQUENCE LISTING, TABLE OR COMPUTER PROGRAM

The Sequence Listing is concurrently submitted herewith with the specification as an ASCII formatted text file via EFS-Web with a file name of Sequence Listing.txt with a creation date of Dec. 17, 2020, and a size of 22.0 kilobytes. The Sequence Listing filed via EFS-Web is part of the specification and is hereby incorporated in its entirety by reference herein.

FIELD OF THE INVENTION

The present invention relates to a humanized BCMA antibody and BCMA-CAR-T Cells. The humanized BCMA-CAR-T cells specifically decrease multiple myeloma tumor growth, and they are useful in the field of adoptive immunity gene therapy for tumors.

BACKGROUND OF THE INVENTION

Immunotherapy is emerging as a highly promising approach for the treatment of cancer. T cells or T lymphocytes, the armed forces of our immune system, constantly look for foreign antigens and discriminate abnormal (cancer or infected cells) from normal cells. Genetically modifying T cells with CAR (Chimeric antigen receptor) constructs is the most common approach to design tumor-specific T cells. CAR-T cells targeting tumor-associated antigens (TAA) can be infused into patients (called adoptive cell transfer or ACT) representing an efficient immunotherapy approach [1, 2]. The advantage of CAR-T technology compared with chemotherapy or antibody is that reprogrammed engineered T cells can proliferate and persist in the patient ("a living drug")[1, 3].

CARs typically consist of a monoclonal antibody-derived single-chain variable fragment (scFv) at the N-terminal part, hinge, transmembrane domain and a number of intracellular co-activation domains: (i) CD28, (ii) CD137 (4-1BB), CD27, or other co-stimulatory domains, in tandem with an activation CD3-zeta domain. (FIG. 1) [1, 2]. The evolution of CARs went from first generation (with no co-stimulation domains) to second generation (with one co-stimulation domain) to third generation CAR (with several co-stimulation domains). Generating CARs with two costimulatory domains (the so-called $3^{rd}$ generation CAR) have led to increased cytolytic CAR-T cell activity, improved persistence of CAR-T cells leading to its augmented antitumor activity.

BCMA

B cell maturation antigen (BCMA) is a cell surface receptor, also known as CD269 and tumor necrosis factor receptor superfamily member 17 (TNFRSF17), that is encoded by TNFRSF17 gene. This receptor is expressed mainly in mature B lymphocytes and in most cases overexpressed in multiple myeloma (MM) [3]. Current therapies to target BCMA in MM include monoclonal antibodies, bi-specific antibodies and T cellular immunotherapies, CAR-T therapies [3], [4].

BCMA Structure and Signaling

The human BCMA protein consists of 184 amino-acids: 1-54-extracellular domain; 55-77-transmembrane domain; 78-184-cytoplasmic domain. The amino-acid sequence of BCMA is shown on FIG. 2. BCMA lacks signaling peptide and resembles other receptors BAFF Receptor and transmembrane activator and cyclophilin ligand interactor and calcium modulator (TACI) [4]. These receptors play major role in B cell maturation and differentiation into plasma cells. Their ligands include BAFF and APRIL which expression is increase in MM patients [4]. Monoclonal antibodies target receptor-ligand interactions, and CAR-T cell therapy binds BCMA and kill MM cells. BCMA also interacts with TRAF1,2,3,5 and 6. This invention is based on humanized BCMA-CAR-T cells targeting BCMA in MM. The advantage of humanized BCMA-CAR-T cells it has humanized BCMA scFv that is less immunogenic than mouse ScFv to humans because it has human sequences in scFv.

DETAILED DESCRIPTION OF THE INVENTION

Definitions

Figures 1, 2:
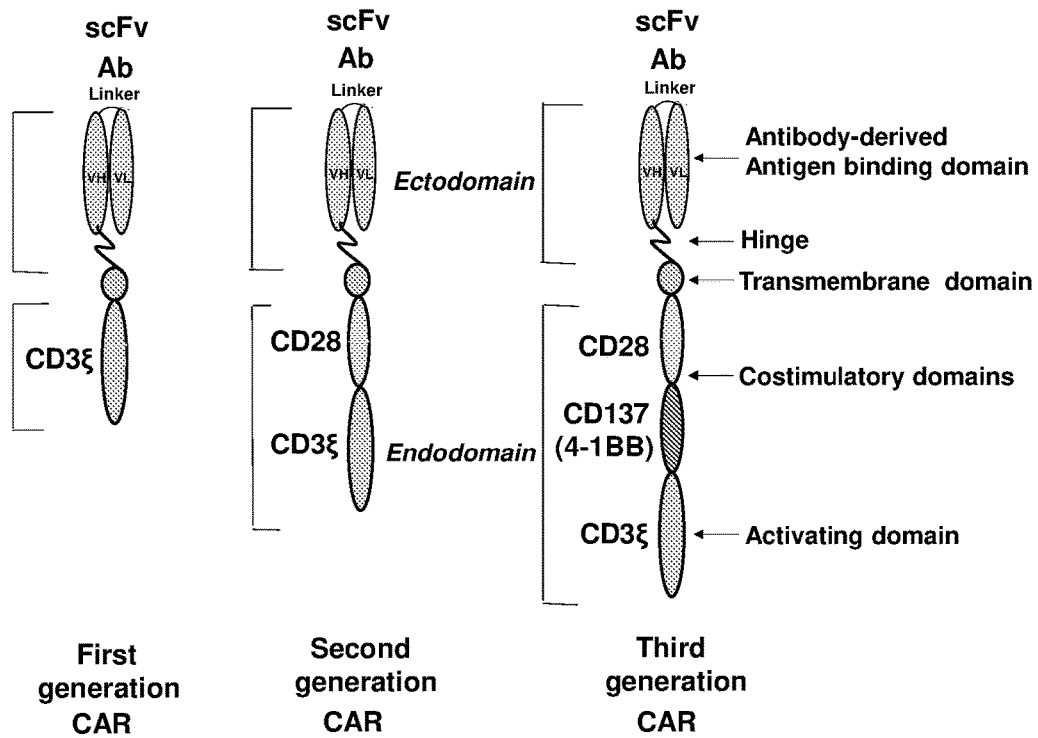
FIG. 1. The structures of CAR. On the left panel: the structure of first generation (no costimulatory domains). On the middle panel-second generation with one co-stimulation domain (CD28 or 4-BB). On the right panel-third generation of CAR (two or several co-stimulation domains) are shown [6].
FIG. 2. The amino-acid sequence of BCMA protein (SEQ ID NO: 1). Extracellular domain is underlined.

As used herein, a "chimeric antigen receptor (CAR)" is a receptor protein that has been engineered to give T cells the new ability to target a specific protein. The receptor is chimeric because they combine both antigen-binding and T-cell activating functions into a single receptor. CAR is a fused protein comprising an extracellular domain capable of binding to an antigen, a transmembrane domain, and at least one intracellular domain. The "chimeric antigen receptor (CAR)" is sometimes called a "chimeric receptor", a "T-body", or a "chimeric immune receptor (CIR)." The "extracellular domain capable of binding to an antigen" means any oligopeptide or polypeptide that can bind to a certain antigen. The "intracellular domain" means any oligopeptide or polypeptide known to function as a domain that transmits a signal to cause activation or inhibition of a biological process in a cell.

As used herein, "humanized antibodies" are antibodies from non-human species whose protein sequences have been modified to increase their similarity to antibody variants produced naturally in humans.

As used herein, a "domain" means one region in a polypeptide which is folded into a particular structure independently of other regions.

As used herein, a "single chain variable fragment (scFv)" means a single chain polypeptide derived from an antibody which retains the ability to bind to an antigen. An example of the scFv includes an antibody polypeptide which is formed by a recombinant DNA technique and in which Fv regions of immunoglobulin heavy chain (H chain) and light chain (L chain) fragments are linked via a spacer sequence. Various methods for engineering an scFv are known to a person skilled in the art.

As used herein, a "tumor antigen" means a biological molecule having antigenicity, expression of which causes cancer.

The present invention is directed to a humanized monoclonal anti-human BCMA antibody clone (PM 308), obtained by sequencing and humanizing mouse monoclonal anti-BMCA antibody (hybridoma clone 4C8A, WO2019/195017). The humanized anti-human BCMA antibody comprises humanized $V_H$ having the amino acid of SEQ ID NO: 4 and humanized $V_L$ having the amino acid of SEQ ID NO: 5. In one embodiment, the humanized anti-human BCMA antibody is a single-chain variable fragment (scFv). ScFv can be $V_H$-linker-$V_L$ or $V_L$-linker-$V_H$.

The present invention is also directed to a chimeric antigen receptor fusion protein comprising from N-terminus to C-terminus: (i) a single-chain variable fragment (scFv) against BCMA (the present invention), (ii) a transmembrane domain, (iii) at least one co-stimulatory domains, and (iv) an activating domain.

In one embodiment, the co-stimulatory domain of CAR is selected from the group consisting of CD28, 4-1BB, GITR, ICOS-1, CD27, OX-40 and DAP10. A preferred the co-stimulatory domain is CD28 or 4-1BB.

A preferred activating domain is CD3 zeta (CD3 Z or CD3ζ).

The transmembrane domain may be derived from a natural polypeptide, or may be artificially designed. The transmembrane domain derived from a natural polypeptide can be obtained from any membrane-binding or transmembrane protein. For example, a transmembrane domain of a T cell receptor α or β chain, a CD3 zeta chain, CD28, CD3ε, CD45, CD4, CD5, CD8, CD9, CD16, CD22, CD33, CD37, CD64, CD80, CD86, CD134, CD137, ICOS, CD154, or a GITR can be used. The artificially designed transmembrane domain is a polypeptide mainly comprising hydrophobic residues such as leucine and valine. It is preferable that a triplet of phenylalanine, tryptophan and valine is found at each end of the synthetic transmembrane domain. Optionally, a short oligopeptide linker or a polypeptide linker, for example, a linker having a length of 2 to 10 amino acids can be arranged between the transmembrane domain and the intracellular domain. In one embodiment, a linker sequence having a glycine-serine continuous sequence can be used.

The present invention provides a nucleic acid encoding the BCMA-CAR. The nucleic acid encoding the CAR can be prepared from an amino acid sequence of the specified CAR by a conventional method. A base sequence encoding an amino acid sequence can be obtained from the aforementioned NCBI RefSeq IDs or accession numbers of GenBank for an amino acid sequence of each domain, and the nucleic acid of the present invention can be prepared using a standard molecular biological and/or chemical procedure. For example, based on the base sequence, a nucleic acid can be synthesized, and the nucleic acid of the present invention can be prepared by combining DNA fragments which are obtained from a cDNA library using a polymerase chain reaction (PCR).

A nucleic acid encoding the CAR of the present invention can be inserted into a vector, and the vector can be introduced into a cell. For example, a virus vector such as a retrovirus vector (including an oncoretrovirus vector, a lentivirus vector, and a pseudo type vector), an adenovirus vector, an adeno-associated virus (AAV) vector, a simian virus vector, a vaccinia virus vector or a sendai virus vector, an Epstein-Barr virus (EBV) vector, and a HSV vector can be used. A virus vector lacking the replicating ability so as not to self-replicate in an infected cell is preferably used.

For example, when a retrovirus vector is used, a suitable packaging cell based on a LTR sequence and a packaging signal sequence possessed by the vector can be selected for preparing a retrovirus particle using the packaging cell. Examples of the packaging cell include PG13 (ATCC CRL-10686), PA317 (ATCC CRL-9078), GP+E-86 and GP+envAm-12, and Psi-Crip. A retrovirus particle can also be prepared using a 293 cell or a 293T cell having high transfection efficiency. Many kinds of retrovirus vectors produced based on retroviruses and packaging cells that can be used for packaging of the retrovirus vectors are widely commercially available from many companies.

A CAR-T cell binds to a specific antigen via the CAR, thereby a signal is transmitted into the cell, and as a result, the cell is activated. The activation of the cell expressing the CAR is varied depending on the kind of a host cell and an intracellular domain of the CAR, and can be confirmed based on, for example, release of a cytokine, improvement of a cell proliferation rate, change in a cell surface molecule, or the like as an index. For example, release of a cytotoxic cytokine (a tumor necrosis factor, lymphotoxin, etc.) from the activated cell causes destruction of a target cell expressing an antigen. In addition, release of a cytokine or change in a cell surface molecule stimulates other immune cells, for example, a B cell, a dendritic cell, a NK cell, and a macrophage.

The cell expressing the CAR can be used as a therapeutic agent for a disease. The therapeutic agent comprises the cell expressing the CAR as an active ingredient, and it may further comprise a suitable excipient.

The inventors have generated CAR-T cells based on a humanized BCMA ScFv sequence specifically targeting BCMA. The inventors have produced humanized BCMA-CAR-T cells to target cancer cells overexpressing BCMA tumor antigen. BCMA-CAR-T cells secreted high levels of cytokines, were positive by cytotoxicity assay with CHO-BCMA cells but not by control CHO cells, which indicates specific killing activity of CAR-T cells against target cancer cells with their cytotoxic activity against tumor or viral antigens.

The advantages of the humanized BCMA-ScFv of the present invention include less immunogenicity to human due to humanized BCMA scFv. Thus, the BCMA antibody of the present invention is highly potent and advantageous as therapeutic agents in many clinical applications.

The present humanized BCMA ScFv or antibody can be used for immunotherapy applications: toxin/drug-conjugated antibody, monoclonal therapeutic antibody, humanization of BCMA antibody, and CAR-T cell immunotherapy.

Humanized BCMA-CAR-T cells using the present humanized BCMA ScFv can be effectively used to target BCMA antigen in BCMA-positive cancer cell lines.

Humanized BCMA-CAR-T cells can be used in combination with different chemotherapy: checkpoint inhibitors; targeted therapies, small molecule inhibitors, antibodies.

Humanized BCMA-CAR-T cells can be used clinically for BCMA-positive cancer cells.

Modifications of co-activation domains: CD28, 4-1BB and others can be used to increase its efficacy. Tag-conjugated humanized BCMA scFv can be used for CAR generation.

Humanized BCMA-CAR-T cells can be used with different safety switches: t-EGFR, RQR (Rituximab-CD34-Rituximab) and other.

Third generation CAR-T or other co-activation signaling domains can be used for the same humanized BCMA-ScFv inside CAR.

The humanized BCMA CAR can be combined with other CARs targeting other tumor antigens or tumor microenvironment, e.g., VEGFR-1-3, PDL-1. Bi-specific antibodies with BCMA and CD3 or other antigens can be generated for therapy.

The humanized BCMA-CAR-T cells can be used against cancer stem cells that are most resistant against chemotherapy and form aggressive tumors.

The present BCMA-CAR can be used to generate other types of cells such as BCMA-CAR-natural killer (NK) cells, BCMA-CAR-macrophages, and other BCMA-CAR hematopoietic cells, which can target BCMA-positive cancers. The present invention provides T cells, or NK cells, macrophages, or other hematopoietic cells, modified to express the BCMA-CAR.

The following examples further illustrate the present invention. These examples are intended merely to be illustrative of the present invention and are not to be construed as being limiting.

EXAMPLES

The inventors generated humanized BCMA-ScFv-CAR constructs inside lentiviral vector cloned into Xba I and Eco R I sites of lentiviral vector. The lentiviral CAR construct contained the humanized BCMA ScFv-CD28/4-1BB-CD3zeta insert—between the Xba I and Eco RI cloning sites. The CAR was under either Ef1 or MNDU3 promoter.

The lentiviruses were generated in 293T cells and titer was established by RT-PCR. Then equal dose of lentiviruses was used for transduction of T cells.

Example 1. Humanized BCMA VH and VL and scFv Sequences

The BCMA scFv was obtained by sequencing hybridoma clones 4C8A4 and 4C8A10 positive for BCMA. The structure of humanized BCMA (PMC308) scFv is: VH-linker-VL. Linker is G4Sx3.

The bold highlights the nucleotide sequence of humanized BCMA PMC308 ScFv clone: $V_H$; the underlined highlights the nucleotide sequence of $V_L$; in between (italicized) is the nucleotide sequence encoding a linker.

(SEQ ID NO: 2)
caggtgcagctggtgcagagcggcgcggaagtgaaaaaaccgggcgcga gcgtgaaagtgagctgcaaagcgagcggctataccttaccagctatgt gatgcattgggtgcgccaggcgccgggccagggcctggaatggatgggc tatattattccgtataacgatgcgaccaaatataacgaaaaatttaaag gccgcgtgaccatgacccgcgataccagcaccagcaccgtgtatatgga actgagcagcctgcgcagcgaagataccgcggtgtattattgcgcgcgc tataactatgatggctatttttgatgtgtggggccagggcaccctggtga ccgtgagcagc*ggcggcggcggcagcggcggcggcggcagcggcggcgg*

*cggcagc*gatgtggtgatgacccagagcccggcgtttctgagcgtgacc ccgggcgaaaaagtgaccattacctgccgcgcgagccagagcattagcg attatctgcattggtatcagcagaaaccggatcaggcgccgaaactgct gattaaatatgcgagccagagcattagcggcgtgccgagccgctttagc ggcagcggcagcggcaccgatttacctttaccattagcagcctggaag cggaagatgcggcgacctattattgccagaacggccatagctttccgcc gacctttggcggcggcaccaaagtggaaattaaa Humanized BCMA (PMC308) scFv Protein (SEQ ID NO: 3):

Q V Q L V Q S G A E V K K P G A S V K V S C K A S

G Y T F T S Y V M H W V R Q A P G Q G L E W M G Y

I I P Y N D A T K Y N E K F K G R V T M T R D T S

T S T V Y M E L S S L R S E D T A V Y Y C A R Y N

Y D G Y F D V W G Q G T L V T V S S *G G G G S G G*

*G G S G G G G S* D V V M T Q S P A F L S V T P G E

K V T I T C R A S Q S I S D Y L H W Y Q Q K P D Q

A P K L L I K Y A S Q S I S G V P S R F S G S G S

G T D F T F T I S S L E A E D A A T Y Y C Q N G H

S F P P T F G G G T K V E I K

In the scFv protein, the bold highlights the amino acid sequence of $V_H$ (SEQ ID NO: 4):
Q V Q L V Q S G A E V K K P G A S V K V S C K A S

G Y T F T S Y V M H W V R Q A P G Q G L E W M G Y

I I P Y N D A T K Y N E K F K G R V T M T R D T S

T S T V Y M E L S S L R S E D T A V Y Y C A R Y N

Y D G Y F D V W G Q G T L V T V S S

In the scFv protein, the underlined highlights the amino sequence of $V_L$ (SEQ ID NO: 5):
D V V M T Q S P A F L S V T P G E K V T I T C R A

S Q S I S D Y L H W Y Q Q K P D Q A P K L L I K Y

A S Q S I S G V P S R F S G S G S G T D F T F T I

S S L E A E D A A T Y Y C Q N G H S F P P T F G G

G T K V E I K

-continued

The linker sequence is 3xG4S
(SEQ ID NO: 6)
G G G G S G G G G S G G G G S.

Example 2. Humanized BCMA-CAR Sequences

Figure 3:
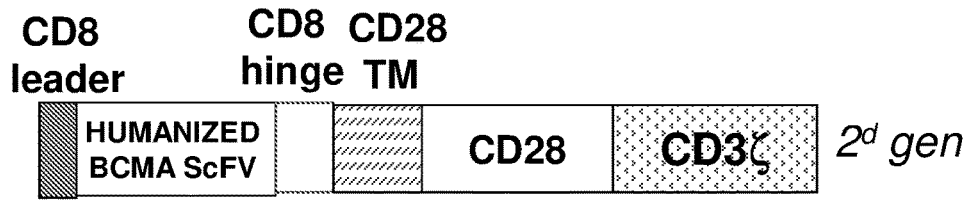
FIG. 3. The structure of humanized BCMA CAR construct. This is second generation of CAR.

The scheme of humanized (PMC308) BCMA-CAR construct is shown on FIG. 3. Lentiviral vector with EF1a promoter was used for cloning of humanized scFv CAR sequences.

The following nucleotide and amino acid sequences show CD8 leader-humanized BCMA ScFv-CD8 hinge-TM28-CD28/4-1BB-CD3 zeta of the present invention. The CAR structure includes human CD8 signaling peptide (CD8 leader), humanized BCMA scFv ($V_H$-Linker 3×(G4S)-$V_L$), human CD8 hinge, human CD28 transmembrane, co-stimulating domains CD28 or 4-1BB, human CD3 zeta (FIG. 3).

A. CD28 as a Co-Stimulating Domain

The nucleic acid sequence and amino acid sequence of each segment of CD8 leader-BCMA scFv ($V_H$-Linker-$V_L$)-CD8 hinge-CD28 TM-CD28-CD3-zeta (BCMA-CD28 CAR) are shown below.

<CD8 leader>
(SEQ ID NO: 7)
ATGGCCTTACCAGTGACCGCCTTGCTCCTGCCGCTGGCCTTGCTGCTCC

ACGCCGCCAGGCCGgctagc (SEQ ID NO: 8)
MALPVTALLLPLALLLHAARPAS

<Humanized BCMA scFv, Clone 4C8A>
See Example 1 for nucleic acid sequences and amino acid sequences.

<XhoI restriction site>
CTCGAG

<CD8 hinge underlined>
(SEQ ID NO: 9)
AAGCCCACCACGACGCCAGCGCCGCGACCACCAACACCGGCGCCCACCA

TCGCGTCGCAGCCCCTGTCCCTGCGCCCAGAGGCGAGCCGGCCAGCGGC

GGGGGGCGCAGTGCACACGAGGGGGCTGGACTTCGCCAGTGATaagccc (SEQ ID NO: 10)
KPTTTPAPRPPTPAPTIASQPLSLRPEASRPAAGGAVHTRGLDFASDKP

<CD28 TM>
(SEQ ID NO: 11)
TTTTGGGTGCTGGTGGTGGTTGGTGGAGTCCTGGCTTGCTATAGCTTGC

TAGTAACAGTGGCCTTTATTATTTTCTGGGTG (SEQ ID NO: 12)
F W V L V V V G G V L A C Y S L L V T V A F I I F
W V

<CD28/Co-stimulation domain>
(SEQ ID NO: 13)
AGGAGTAAGAGGAGCAGGCTCCTGCACAGTGACTACATGAACATGACTC

CCCGCCGCCCCGGGCCCACCCGCAAGCATTACCAGCCCTATGCCCCACC

ACGCGACTTCGCAGCCTATCGCTCC (SEQ ID NO: 14)
R S K R S R L L H S D Y M N M T P R R P G P T R K

H Y Q P Y A P P R D F A A Y R S

<CD3 zeta>
(SEQ ID NO: 15)
AGAGTGAAGTTCAGCAGGAGCGCAGACGCCCCCGCGTACCAGCAGGGCC

AGAACCAGCTCTATAACGAGCTCAATCTAGGACGAAGAGAGGAGTACGA

TGTTTTGGACAAGAGACGTGGCCGGGACCCTGAGATGGGGGGAAAGCCG

CAGAGAAGGAAGAACCCTCAGGAAGGCCTGTACAATGAACTGCAGAAAG

ATAAGATGGCGGAGGCCTACAGTGAGATTGGGATGAAAGGCGAGCGCCG

GAGGGGCAAGGGGCACGATGGCCTTTACCAGGGTCTCAGTACAGCCACC

AAGGACACCTACGACGCCCTTCACATGCAGGCCCTGCCCCCTCGCTAAt ag (SEQ ID NO: 16)
RVKFSRSADAPAYQQGQNQLYNELNLGRREEYDVLDKRRGRDPEMGGKP

QRRKNPQEGLYNELQKDKMAEAYSEIGMKGERRRGKGHDGLYQGLSTAT

KDTYDALHMQALPPR

<EcoRI restriction site>
gaattc

Translated amino-acid sequence of humanized BCMA-CAR protein with CD28 as a co-stimulating domain is shown below.

(SEQ ID NO: 17)
QVQLVQSGAEVKKPGASVKVSCKASGYTFTSYVMHWVRQAPGQGLEWMG

YIIPYNDATKYNEKFKGRVTMTRDTSTSTVYMELSSLRSEDTAVYYCAR

YNYDGYFDVWGQGTLVTVSSGGGGSGGGGSGGGGSDVVMTQSPAFLSVT

PGEKVTITCRASQSISDYLHWYQQKPDQAPKLLIKYASQSISGVPSRFS

GSGSGTDFTFTISSLEAEDAATYYCQNGHSFPPTFGGGTKVEIKLEKPT

TTPAPRPPTPAPTIASQPLSLRPEASRPAAGGAVHTRGLDFASDKPFWV

LVVVGGVLACYSLLVTVAFIIFWVRSKRSRLLHSDYMNMTPRRPGPTRK

HYQPYAPPRDFAAYRSRVKFSRSADAPAYQQGQNQLYNELNLGRREEYD

VLDKRRGRDPEMGGKPQRRKNPQEGLYNELQKDKMAEAYSEIGMKGERR

RGKGHDGLYQGLSTATKDTYDALHMQALPPR

B. 41-BB as a Co-Stimulating Domain

We also generated CAR (PMC709) under MNDU3 promoter using the same humanized BCMA scFv with 4-1BB domain instead of CD28 domain as a co-stimulating domain.

Nucleotide sequence of 4-1BB domain:
(SEQ ID NO: 18)
AAACGGGGCAGAAAGAAACTCCTGTATATATTCAAACAACCATTTATGA

GACCAGTACAAACTACTCAAGAGGAAGATGGCTGTAGCTGCCGATTTCC

AGAAGAAGAAGAAGGAGGATGTGAACTG

-continued

Amino acid sequence of 4-1BB domain:
(SEQ ID NO: 19)
KRGRKKLLYIFKQPFMRPVQTTQEEDGCSCRFPEEEEGGCEL Nucleotide sequence of CAR (4-1BB)
(SEQ ID NO: 20)
ATGGCCTTACCAGTGACCGCCTTGCTCCTGCCGCTGGCCTTGCTGCTCC

ACGCCGCCAGGCCGGCTAGCCAGGTGCAGCTGGTGCAGAGCGGCGCGGA

AGTGAAAAAACCGGGCGCGAGCGTGAAAGTGAGCTGCAAAGCGAGCGGC

TATACCTTTACCAGCTATGTGATGCATTGGGTGCGCCAGGCGCCGGGCC

AGGGCCTGGAATGGATGGGCTATATTATTCCGTATAACGATGCGACCAA

ATATAACGAAAAATTTAAAGGCCGCGTGACCATGACCCGCGATACCAGC

ACCAGCACCGTGTATATGGAACTGAGCAGCCTGCGCAGCGAAGATACCG

CGGTGTATTATTGCGCGCGCTATAACTATGATGGCTATTTTGATGTGTG

GGGCCAGGGCACCCTGGTGACCGTGAGCAGCGGCGGCGGCGGCAGCGGC

GGCGGCGGCAGCGGCGGCGGCGGCAGCGATGTGGTGATGACCCAGAGCC

CGGCGTTTCTGAGCGTGACCCCGGGCGAAAAAGTGACCATTACCTGCCG

CGCGAGCCAGAGCATTAGCGATTATCTGCATTGGTATCAGCAGAAACCG

GATCAGGCGCCGAAACTGCTGATTAAATATGCGAGCCAGAGCATTAGCG

GCGTGCCGAGCCGCTTTAGCGGCAGCGGCAGCGGCACCGATTTTACCTT

TACCATTAGCAGCCTGGAAGCGGAAGATGCGGCGACCTATTATTGCCAG

AACGGCCATAGCTTTCCGCCGACCTTTGGCGGCGGCACCAAAGTGGAAA

TTAAACTCGAGAAGCCCACCACGACGCCAGCGCCGCGACCACCAACACC

GGCGCCACCATCGCGTCGCAGCCCCTGTCCCTGCGCCCAGAGGCGAGC

CGGCCAGCGGCGGGGGCGCAGTGCACACGAGGGGGCTGGACTTCGCCA

GTGATAAGCCCTTTTGGGTGCTGGTGGTGGTTGGTGGAGTCCTGGCTTG

CTATAGCTTGCTAGTAACAGTGGCCTTTATTATTTTCTGGGTGAAACGG

GGCAGAAAGAAACTCCTGTATATATTCAAACAACCATTTATGAGACCAG

TACAAACTACTCAAGAGGAAGATGGCTGTAGCTGCCGATTTCCAGAAGA

AGAAGAAGGAGGATGTGAACTGAGAGTGAAGTTCAGCAGGAGCGCAGAC

GCCCCCGCGTACCAGCAGGGCCAGAACCAGCTCTATAACGAGCTCAATC

TAGGACGAAGAGAGGAGTACGATGTTTGGACAAGAGACGTGGCCGGGA

CCCTGAGATGGGGGGAAAGCCGCAGAGAAGGAAGAACCCTCAGGAAGGC

CTGTACAATGAACTGCAGAAAGATAAGATGGCGGAGGCCTACAGTGAGA

TTGGGATGAAAGGCGAGCGCCGGAGGGGCAAGGGGCACGATGGCCTTTA

CCAGGGTCTCAGTACAGCCACCAAGGACACCTACGACGCCCTTCACATG

CAGGCCCTGCCCCCTCGCTAA

Amino acid sequence of CAR (4-1BB)
(SEQ ID NO: 21)
MALPVTALLLPLALLLHAARPASQVQLVQSGAEVKKPGASVKVSCKASG

YTFTSYVMHWVRQAPGQGLEWMGYIIPYNDATKYNEKFKGRVTMTRDTS

TSTVYMELSSLRSEDTAVYYCARYNYDGYFDVWGQGTLVTVSSGGGGSG

GGGSGGGGSDVVMTQSPAFLSVTPGEKVTITCRASQSISDYLHWYQQKP

DQAPKLLIKYASQSISGVPSRFSGSGSGTDFTFTISSLEAEDAATYYCQ

-continued

NGHSFPPTFGGGTKVEIKLEKPTTTPAPRPPTPAPTIASQPLSLRPEAS

RPAAGGAVHTRGLDFASDKPFWVLVVVGGVLACYSLLVTVAFIIFWVKR

GRKKLLYIFKQPFMRPVQTTQEEDGCSCRFPEEEEGGCELRVKFSRSAD

APAYQQGQNQLYNELNLGRREEYDVLDKRRGRDPEMGGKPQRRKNPQEG

LYNELQKDKMAEAYSEIGMKGERRRGKGHDGLYQGLSTATKDTYDALHM

QALPPR

Example 3. CAR Lentivirus Production

The inventors generated BCMA CAR constructs inside lentiviral vector cloned into lentiviral vector. BCMA-CD28-CD3 lentiviral CAR construct containing the BCMA ScFv-CD28-CD3zeta insert was prepared under EF1 promoter (PMC308). BCMA-4-1BB-CD3 lentiviral CAR construct containing the BCMA ScFv-4-1BB-CD3zeta insert was prepared under MNDU3 promoter (PMC709).

The lentiviruses were generated in 293 T cells and titer was established by RT-PCR or by functional FACS with 293 cells as described [7]. Then equal dose of lentiviruses was used for transduction of T cells.

Example 4. Peripheral Blood Mononuclear Cell (PBMC) Isolation from Whole Blood Whole blood (Stanford Hospital Blood Center, Stanford, CA) was collected from individual or mixed donors (depending on the amount of blood required) in 10 mL Heparin vacutainers (Becton Dickinson). Approximately 10 ml of whole anti-coagulated blood was mixed with sterile phosphate buffered saline (PBS) buffer for a total volume of 20 ml in a 50 ml conical centrifuge tube (PBS, pH 7.4, is without $Ca^{+2}/Mg^{+2}$). The layer of cells containing peripheral blood mononuclear cells (PBMC), seen at the diluted plasma/Ficoll interface was removed very carefully, avoiding any Ficoll, washed twice with PBS, and centrifuged at 200×g for 10 min at room temperature. Cells were counted with a hemocytomter. The PBMC were washed once with CAR-T media (AIM V-AlbuMAX (BSA) (Life Technologies), with 5% AB serum and 1.25 ug/mL amphotericin B (Gemini Bioproducts, Woodland, CA), 100 U/mL penicillin, and 100 ug/mL streptomycin) and were either used for experiments or were frozen at −80° C. for next experiment.

Example 5. T-Cell Activation from PBMC

Freshly isolated PBMC were washed with 1×PBS (pH7.4, no $Ca^{2+}/Mg^{2+}$) and washed once in CAR-T media (AIM V-AlbuMAX (BSA)(Life Technologies), with 5% AB serum and 1.25 µg/mL amphotericin B (Gemini Bioproducts, Woodland, CA), 100 U/mL penicillin, and 100 µg/mL streptomycin), in the absence of human interleukin-2 (huIL-2) (Invitrogen), at a concentration of $5 \times 10^5$ cells/mL. The cells were resuspended to a final concentration of $5 \times 10^5$ cells/mL in CAR-T medium with 300 U/mL huIL2. The PBMC was activated with CD3-CD28 beads with 1:1 bead-to-cell ratio. Desired number of aliquots were dispensed to single wells of a culture plate, and then incubated at 37° C. in the presence of CO2 for 24 hours before viral transduction.

Example 6. T-Cell Transduction and Expansion

Following activation of PBMC, the cells were incubated for 24 hr at 37° C., 5% CO2. To each well of $1 \times 10^6$ cells, $5 \times 10^6$ lentivirus, and 2 μL/mL of media of Transplus (Alstem, Richmond, CA) (a final dilution of 1:500) were added. Cells were incubated for an additional 24 hours before repeating addition of virus. Cells were then grown in the continued presence of 300 U/Ml of IL-2 Fresh medium with IL-2 for a period of 12-14 days (total incubation time was dependent on the final umber of CAR-T cells required). Cells concentrations were analyzed every 2-3 days, with media being added at that time to dilute the cell suspension to $1 \times 10^6$ cells/mL.

Example 7. FACS for Detection of CAR-Positive Cells

Cells were washed and suspended in FACS buffer (phosphate-buffered saline (PBS) plus 0.1% sodium azide and 0.4% BSA). Cells were divided them $1 \times 10^6$ aliquots.

Fc receptors were blocked with normal goat IgG (Life Technologies) in ice for 10 min.

Biotin-labeled polyclonal goat anti-mouse-F(ab)$_2$ antibodies (Life Technologies) were used to detect BCMA ScFv; biotin-labeled normal polyclonal goat IgG antibodies (Life Technologies) were used as an isotype control. (1:200 dilution, reaction volume of 100 μl). Cells were incubated at 4° C. for 25 minutes and washed once with FACS buffer.

Cells were suspended in FACS buffer and blocked with normal mouse IgG (Invitrogen) by adding 100 μl 1:1000 diluted normal mouse lgG to each tube. Cells were incubated in ice for 10 min and washed with FACS buffer and re-suspended in 100 μl FACs buffer. The cells were then stained with phycoerythrin (PE)-labeled streptavidin (BD Pharmingen, San Diego, CA) and allophycocyanin (APC)-labeled CD3 (eBiocience, San Diego, CA).

Example 8. Cytotoxicity Assay

The Real-time Cytotoxicity Assay (RTCA) was performed using ACEA machine according to manufacturer's protocol as described [8].

Example 9. Humanized BCMA-CAR-T Cells Killed Multiple Myeloma Cells and Secreted High Level of IFN-Gamma Against BCMA-Positive Cancer Cells We designed humanized BCMA-CAR-T cells with humanized BCMA-CAR construct (PMC308) shown in FIG. 3. We used Mock scFv with unrelated scFv and generated Mock-CAR-T cells as a negative control. Humanized BCMA-CAR-T cells expressed BCMA scFv as detected by FACS (see Example 7). The results show that 43.7% of BCMA-CAR (PMC308) cells were detected by FACS with a mouse FAB antibody, whereas only 1.79% of control T cells were positively detected.

Example 10. Humanized BCMA-CAR-T Cells Killed CHO-BCMA Cells but not CHO Cells

Figure 5:
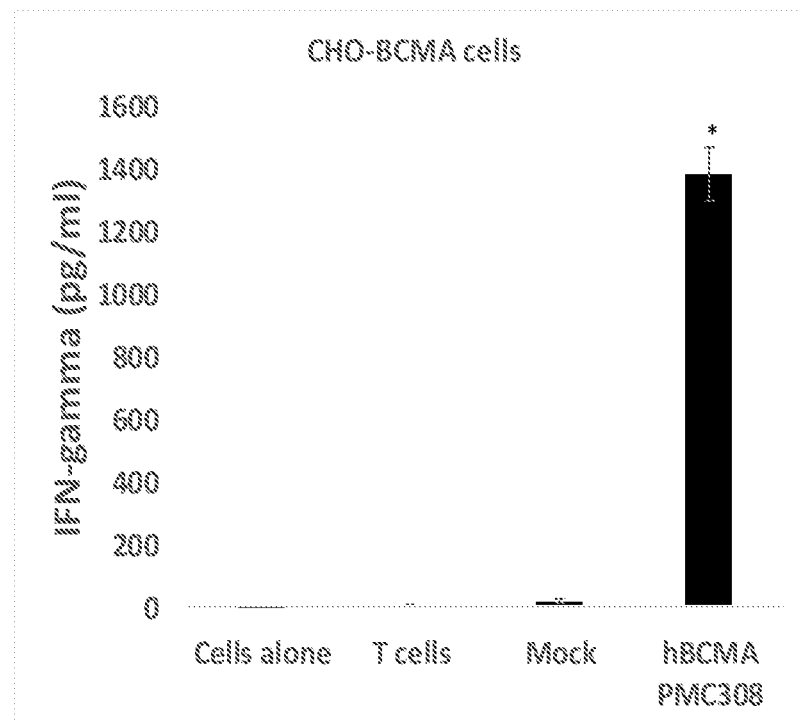
FIG. 5. Humanized BCMA-CAR-T cells secreted high level of IFN-gamma against CHO-BCMA-positive cells. $p<0.05$, IFN-gamma in CHO-BCMA cells versus T and Mock CAR-T cells.

We incubated humanized BCMA-CAR-T cells (PMC308) with target CHO-BCMA target cells and also CHO (BCMA-negative) control cells. XCelligence real-time cytotoxicity assay (RTCA) was used for detection of humanized BCMA-CAR-T cell cytotoxicity. In FIG. 5, normalized cell index is shown on Y-axis, and time is shown on X-axis. Upper panel: CHO-BCMA target cells. on the right: From top to bottom: Mock, T cells, Mock-CAR-T cells and humanized CAR-T cells are shown as effector cells. Lower panel: CHO target cells. From top to bottom on the right, Mock CAR-T cells, Humanized BCMA CAR-T cells, T cells and target cells are shown as effector cells.

Figure 4:
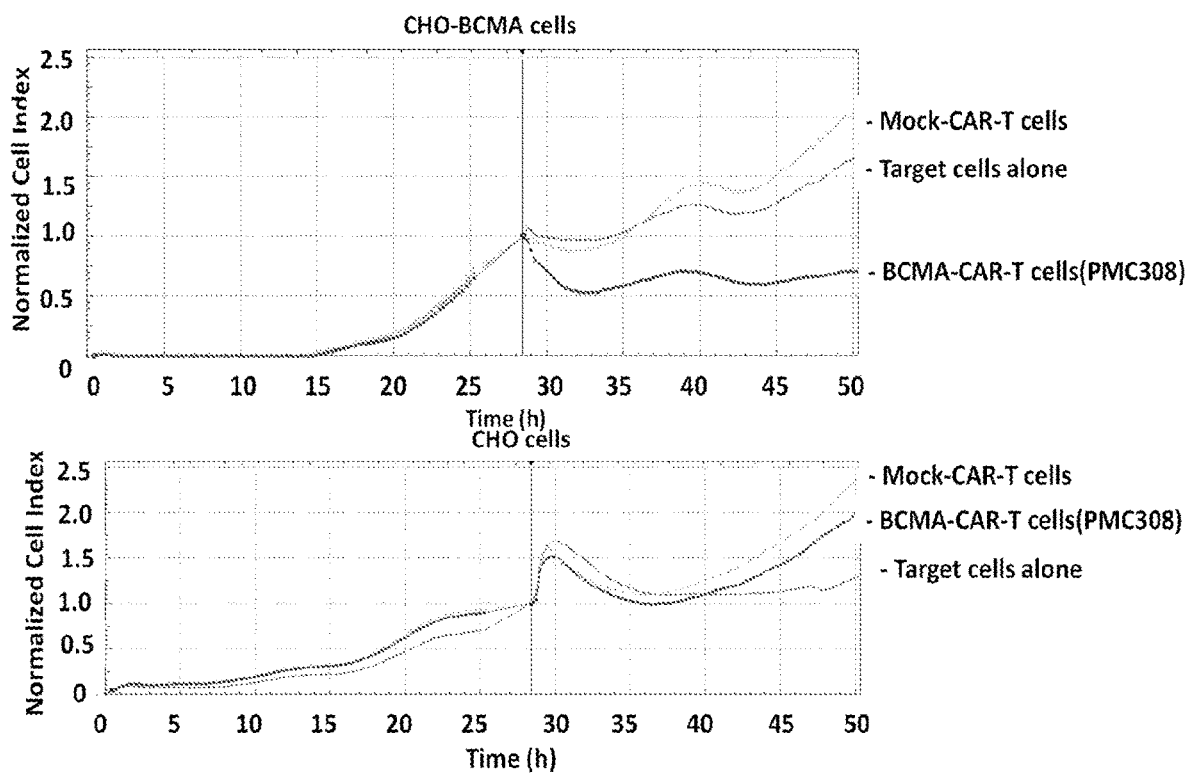
FIG. 4. Humanized BCMA-CAR-T cells killed CHO-BCMA cells but not CHO cells.

The results show that humanized BCMA-CAR-T cells specifically killed CHO-BCMA cells (FIG. 4, upper panel) but not CHO cells (FIG. 4, lower panel). This demonstrates high specificity of humanized BCMA-CAR-T cells to target BCMA antigen-positive target cells and kill BCMA-positive target cells.

Example 11. Humanized CAR-T Cells Secreted IFN-Gamma Against Target CHO-BCMA Cells Significantly We collected supernatant after co-incubation of humanized BCMA-CAR-T cells and target CHO-BCMA cells and performed IFN-gamma assay. BCMA-CAR-T cells secreted high level of IFN-gamma with CHO-BCMA cells (FIG. 5). There was no high secretion of IFN-gamma with control CHO cells (not shown). This confirms specificity of humanized BCMA-CAR-T cells and killing cytotoxicity assay.

Figure 6:
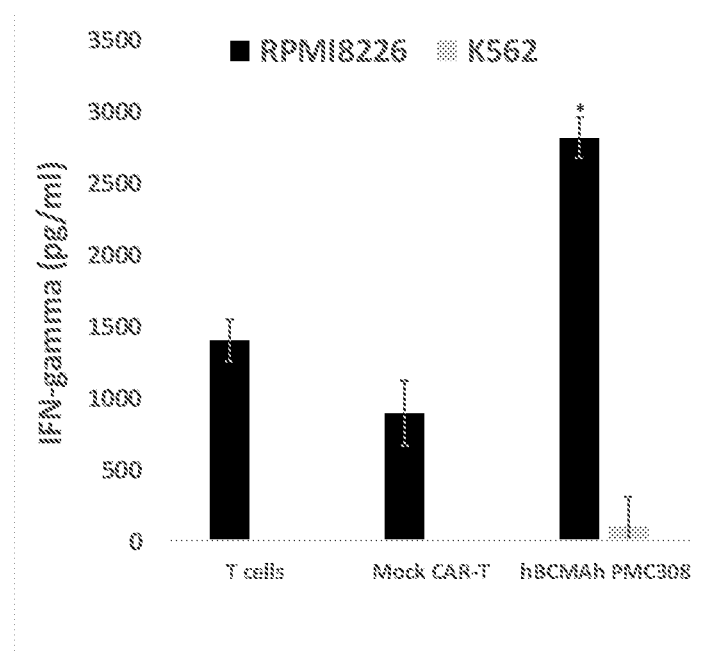
FIG. 6. Humanized BCMA-CAR-T cells secreted high level of IFN-gamma against multiple myeloma cells but not against BCMA-negative K562 control cells. $p<0.05$, IFN-gamma in multiple myeloma cells versus T and Mock-CAR-T cells; and versus IFN-gamma levels in K562 cells.

Example 12. Humanized CAR-T Cells Secreted High Levels of IFN-Gamma Against BCMA-Positive RPMI8226 Multiple Myeloma Cells but not Against BCMA-Negative Leukemia K562 Cells We incubated BCMA-CAR-T cells with multiple myeloma cancer cells RPMI8226 cells and K526 cells and performed ELISA with IFN-gamma using kit from Fisher, according to Fisher's protocol. Humanized BCMA-CAR-T cells secreted high level of IFN-gamma against BCMA-positive multiple myeloma cancer cells but not against BCMA-negative leukemia K562 cells (FIG. 6). The level of killing and secretion of IFN-gamma was significantly higher than with control T and Mock CAR-T cells. This confirms specificity of humanized BCMA-CAR-T cells against hematological BCMA-positive cells.

We also tested BCMA-CAR-T cells (PMC709) which has the same humanized BCMA scFv, but with 4-1BB-CD3 inside lentivirus with MNDU3 promoter. PMC709 BCMA-CAR-T cells also killed CHO-BCMA target cells (data not shown).

Figure 7A:
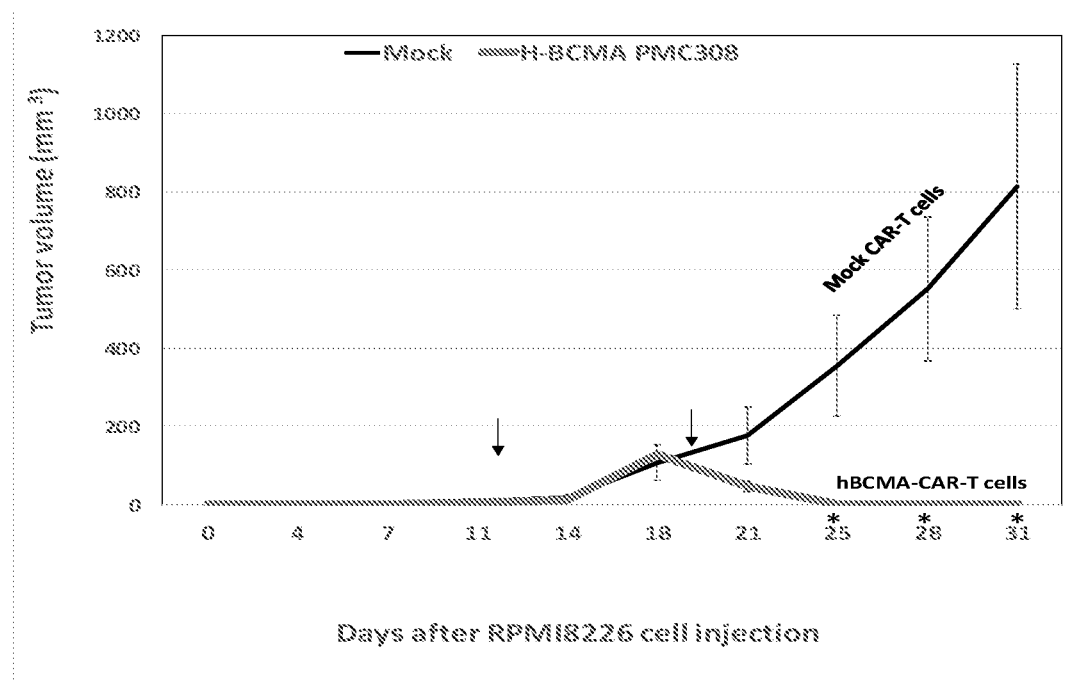
FIG. 7A. Humanized BCMA-CAR-T cells significantly decreased RPMI8226 xenograft tumor growth.

Example 13. Humanized BCMA-CAR-T Cells Significantly Decreased RPMI8226 Xenograft Tumor Growth in Mouse Model In Vivo Multiple myeloma RPMI8226 cells were injected subcutaneously into NSG mice ($1 \times 10^7$ cells/mice), and then humanized BCMA-CAR-T cells were injected twice by i.v. ($1 \times 10^7$ CAR-T cells/mice). FIG. 7A shows humanized BCMA-CAR-T cells significantly decreased RPMI8226 tumor growth in mice. CAR-T cells were injected at day 7 and 20 by i.v $1 \times 10^7$ cells/mice. Bars show average tumor volume+/−standard errors. *$p<0.05$, BCMA vs Mock.

Figure 7B:
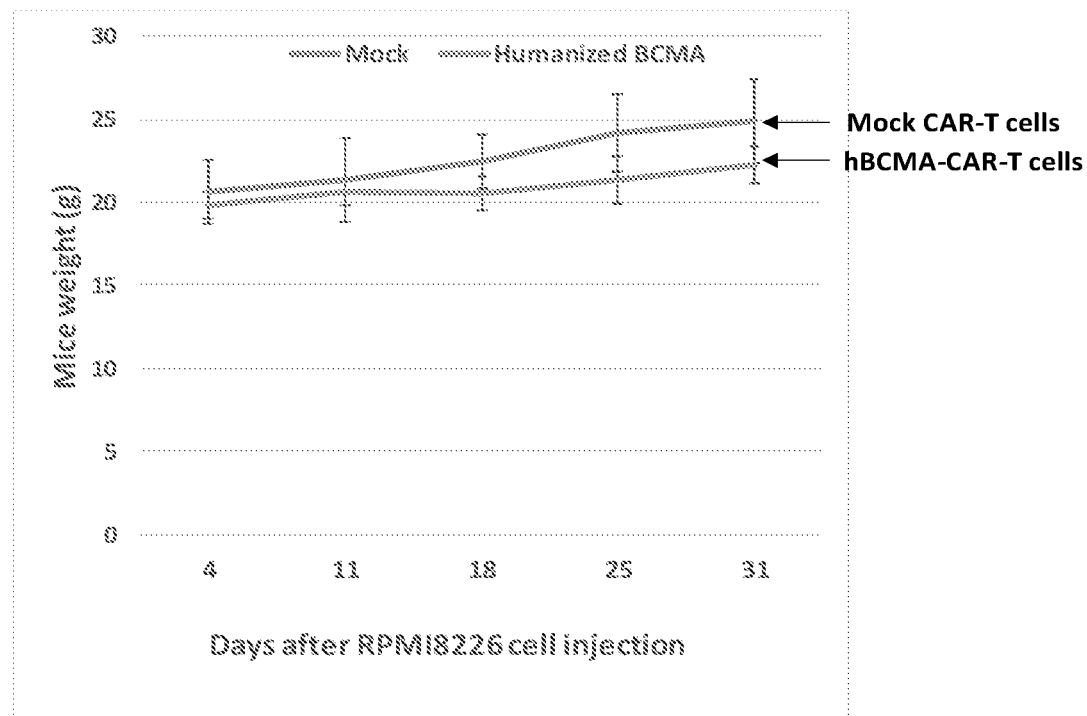
FIG. 7B. Humanized BCMA-CAR-T cells did not decrease mouse body weight.

FIG. 7B shows that mice treated with humanized BCMA-CAR-T cells did not cause a decrease in body weight suggesting that CAR-T cells were not toxic to mice. No behavior or visual changes of mice were observed during the study.

Humanized BCMA-CAR-T were detected in the mouse blood by FACS with BCMA recombinant protein (not shown).

REFERENCES

1. Maus, M. V., Haas, A. R., Beatty, G. L., Albelda, S. M., Levine, B. L., Liu, X., Zhao, Y., Kalos, M., and June, C.

H. (2013). T cells expressing chimeric antigen receptors can cause anaphylaxis in humans. Cancer Immunol Res 1, 26-31.
2. Maus, M. V., Grupp, S. A., Porter, D. L., and June, C. H. (2014). Antibody-modified T cells: CARs take the front seat for hematologic malignancies. Blood 123, 2625-2635.
3. Ali, S. A., Shi, V., Maric, I., Wang, M., Stroncek, D. F., Rose, J. J., Brudno, J. N., Stetler-Stevenson, M., Feldman, S. A., Hansen, B. G., et al. (2016). T cells expressing an anti-B-cell maturation antigen chimeric antigen receptor cause remissions of multiple myeloma. Blood 128, 1688-1700.
4. Tai, Y. T., and Anderson, K. C. (2015). Targeting B-cell maturation antigen in multiple myeloma. Immunotherapy.
5. Boeye, A. (1986). Clonal isolation of hybridomas by manual single-cell isolation. Methods Enzymol 121, 332-340.
6. Golubovskaya, V., Wu, L (2016) Cancers, March 15; 8(3).
7. Berahovich, H. Zhou, S. Xu, Y. Wei, J. Guan, J. Guan, H. Harto, S. Fu, K. Yang, S. Zhu, L. Li, L. Wu, and V. Golubovskaya, CAR-T Cells Based on Novel BCMA Monoclonal Antibody Block Multiple Myeloma Cell Growth. Cancers (Basel) 10 (2018).

What is claimed is:

1. A humanized anti-human BCMA antibody comprising a VH domain consisting of the amino acid sequence of SEQ ID NO: 4 and a VL domain consisting of the amino acid sequence of SEQ ID NO: 5.

2. A single-chain variable fragment (scFv) comprising a VH domain consisting of the amino acid sequence of SEQ ID NO: 4 and a VL domain consisting of the amino acid sequence of SEQ ID NO: 5.

3. The scFv of claim 2, further comprises a linker in between the VH and VL domains.

4. The scFv of claim 3, which has the amino acid sequence of SEQ ID NO: 3.

5. A chimeric antigen receptor (CAR) comprising from N-terminus to C-terminus:

(i) scFv of claim 2,
(ii) a transmembrane domain,
(iii) at least one co-stimulatory domains, and
(iv) an activating domain.

6. The CAR of claim 5, wherein the scFv has the amino acid sequence of SEQ ID NO: 3.

7. The CAR according to claim 5, wherein the co-stimulatory domain is CD28 or 4-1BB.

8. The CAR according to claim 5, wherein the activating domain is CD3 zeta.

9. The CAR of claim 5, which has the amino acid sequence of SEQ ID NO: 17 or 21.

10. A nucleic acid encoding the CAR of claim 5.

11. T cells modified to express the CAR of claim 5.

12. Natural killer cells modified to express the CAR of claim 5.

* * * * *

SEQUENCE LISTING

```
<160> NUMBER OF SEQ ID NOS: 21

<210> SEQ ID NO 1
<211> LENGTH: 184
<212> TYPE: PRT
<213> ORGANISM: Homo sapiens

<400> SEQUENCE: 1

Met Leu Gln Met Ala Gly Gln Cys Ser Gln Asn Glu Tyr Phe Asp Ser
1               5                   10                  15

Leu Leu His Ala Cys Ile Pro Cys Gln Leu Arg Cys Ser Ser Asn Thr
                20                  25                  30

Pro Pro Leu Thr Cys Gln Arg Tyr Cys Asn Ala Ser Val Thr Asn Ser
            35                  40                  45

Val Lys Gly Thr Asn Ala Ile Leu Trp Thr Cys Leu Gly Leu Ser Leu
        50                  55                  60

Ile Ile Ser Leu Ala Val Phe Val Leu Met Phe Leu Leu Arg Lys Ile
65                  70                  75                  80

Asn Ser Glu Pro Leu Lys Asp Glu Phe Lys Asn Thr Gly Ser Gly Leu
                85                  90                  95

Leu Gly Met Ala Asn Ile Asp Leu Glu Lys Ser Arg Thr Gly Asp Glu
            100                 105                 110

Ile Ile Leu Pro Arg Gly Leu Glu Tyr Thr Val Glu Glu Cys Thr Cys
        115                 120                 125

Glu Asp Cys Ile Lys Ser Lys Pro Lys Val Asp Ser Asp His Cys Phe
    130                 135                 140

Pro Leu Pro Ala Met Glu Glu Gly Ala Thr Ile Leu Val Thr Thr Lys
145                 150                 155                 160

Thr Asn Asp Tyr Cys Lys Ser Leu Pro Ala Ala Leu Ser Ala Thr Glu
                165                 170                 175

Ile Glu Lys Ser Ile Ser Ala Arg
            180

<210> SEQ ID NO 2
<211> LENGTH: 720
<212> TYPE: DNA
<213> ORGANISM: Homo sapiens

<400> SEQUENCE: 2
caggtgcagc tggtgcagag cggcgcggaa gtgaaaaaac cgggcgcgag cgtgaaagtg      60
agctgcaaag cgagcggcta ccctttacc agctatgtga tgcattgggt gcgccaggcg      120
ccgggccagg gctggaatg gatgggctat attattccgt ataacgatgc gaccaaatat      180
aacgaaaaat ttaaaggccg cgtgaccatg acccgcgata ccagcaccag caccgtgtat      240
```

| | | | | |
|---|---|---|---|---|
| atggaactga | gcagcctgcg | cagcgaagat | accgcggtgt | attattgcgc gcgctataac | 300 |
| tatgatggct | attttgatgt | gtggggccag | ggcaccctgg | tgaccgtgag cagcggcggc | 360 |
| ggcggcagcg | gcggcggcgg | cagcggcggc | ggcggcagcg | atgtggtgat gacccagagc | 420 |
| ccggcgtttc | tgagcgtgac | cccgggcgaa | aaagtgacca | ttacctgccg cgcgagccag | 480 |
| agcattagcg | attatctgca | ttggtatcag | cagaaaccgg | atcaggcgcc gaaactgctg | 540 |
| attaaatatg | cgagccagag | cattagcggc | gtgccgagcc | gctttagcgg cagcggcagc | 600 |
| ggcaccgatt | ttacctttac | cattagcagc | ctggaagcgg | aagatgcggc gacctattat | 660 |
| tgccagaacg | gccatagctt | tccgccgacc | tttggcggcg | gcaccaaagt ggaaattaaa | 720 |

<210> SEQ ID NO 3
<211> LENGTH: 240
<212> TYPE: PRT
<213> ORGANISM: Homo sapiens

<400> SEQUENCE: 3

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Val Met His Trp Val Arg Gln Ala Pro Gly Gln Gly Leu Glu Trp Met
        35                  40                  45

Gly Tyr Ile Ile Pro Tyr Asn Asp Ala Thr Lys Tyr Asn Glu Lys Phe
    50                  55                  60

Lys Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Asn Tyr Asp Gly Tyr Phe Asp Val Trp Gly Gln Gly Thr
            100                 105                 110

Leu Val Thr Val Ser Ser Gly Gly Gly Ser Gly Gly Gly Gly Ser
        115                 120                 125

Gly Gly Gly Gly Ser Asp Val Val Met Thr Gln Ser Pro Ala Phe Leu
    130                 135                 140

Ser Val Thr Pro Gly Glu Lys Val Thr Ile Thr Cys Arg Ala Ser Gln
145                 150                 155                 160

Ser Ile Ser Asp Tyr Leu His Trp Tyr Gln Gln Lys Pro Asp Gln Ala
                165                 170                 175

Pro Lys Leu Leu Ile Lys Tyr Ala Ser Gln Ser Ile Ser Gly Val Pro
            180                 185                 190

Ser Arg Phe Ser Gly Ser Gly Ser Gly Thr Asp Phe Thr Phe Thr Ile
        195                 200                 205

Ser Ser Leu Glu Ala Glu Asp Ala Ala Thr Tyr Tyr Cys Gln Asn Gly
    210                 215                 220

His Ser Phe Pro Pro Thr Phe Gly Gly Gly Thr Lys Val Glu Ile Lys
225                 230                 235                 240

<210> SEQ ID NO 4
<211> LENGTH: 118
<212> TYPE: PRT
<213> ORGANISM: Homo sapiens

<400> SEQUENCE: 4

Gln Val Gln Leu Val Gln Ser Gly Ala Glu Val Lys Lys Pro Gly Ala
1               5                   10                  15

```
Ser Val Lys Val Ser Cys Lys Ala Ser Gly Tyr Thr Phe Thr Ser Tyr
        20                  25                  30

Val Met His Trp Val Arg Gln Ala Pro Gly Gln Gly Leu Glu Trp Met
        35                  40                  45

Gly Tyr Ile Ile Pro Tyr Asn Asp Ala Thr Lys Tyr Asn Glu Lys Phe
50                      55                  60

Lys Gly Arg Val Thr Met Thr Arg Asp Thr Ser Thr Ser Thr Val Tyr
65                      70                  75                  80

Met Glu Leu Ser Ser Leu Arg Ser Glu Asp Thr Ala Val Tyr Tyr Cys
                85                  90                  95

Ala Arg Tyr Asn Tyr Asp Gly Tyr Phe Asp Val Trp Gly Gln Gly Thr
            100                 105                 110

Leu Val Thr Val Ser Ser
        115
```

```
<210> SEQ ID NO 5
<211> LENGTH: 107
<212> TYPE: PRT
<213> ORGANISM: Homo sapiens

<400> SEQUENCE: 5
```

```
Asp Val Val Met Thr Gln Ser Pro Ala Phe Leu Ser Val Thr Pro Gly
1               5                   10                  15

Glu Lys Val Thr Ile Thr Cys Arg Ala Ser Gln Ser Ile Ser Asp Tyr
            20                  25                  30

Leu His Trp Tyr Gln Lys Pro Asp Gln Ala Pro Lys Leu Leu Ile
        35                  40                  45

Lys Tyr Ala Ser Gln Ser Ile Ser Gly Val Pro Ser Arg Phe Ser Gly
50                  55                      60

Ser Gly Ser Gly Thr Asp Phe Thr Phe Thr Ile Ser Ser Leu Glu Ala
65                  70                  75                  80

Glu Asp Ala Ala Thr Tyr Tyr Cys Gln Asn Gly His Ser Phe Pro Pro
                85                  90                  95

Thr Phe Gly Gly Gly Thr Lys Val Glu Ile Lys
            100                 105
```

```
<210> SEQ ID NO 6
<211> LENGTH: 15
<212> TYPE: PRT
<213> ORGANISM: Artificial Sequence
<220> FEATURE:
<223> OTHER INFORMATION: synthetic

<400> SEQUENCE: 6
```

```
Gly Gly Gly Gly Ser Gly Gly Gly Gly Ser Gly Gly Gly Gly Ser
1               5                   10                  15
```

```
<210> SEQ ID NO 7
<211> LENGTH: 69
<212> TYPE: DNA
<213> ORGANISM: Homo sapiens

<400> SEQUENCE: 7 atggcttac cagtgaccgc cttgctcctg ccgctggcct tgctgctcca cgccgccagg    60
ccggctagc                                                          69
```

```
<210> SEQ ID NO 8
<211> LENGTH: 23
```

<212> TYPE: PRT
<213> ORGANISM: Homo sapiens

<400> SEQUENCE: 8

Met Ala Leu Pro Val Thr Ala Leu Leu Leu Pro Leu Ala Leu Leu Leu
1               5                   10                  15

His Ala Ala Arg Pro Ala Ser
            20

<210> SEQ ID NO 9
<211> LENGTH: 147
<212> TYPE: DNA
<213> ORGANISM: Homo sapiens

<400> SEQUENCE: 9
aagcccacca cgacgccagc gccgcgacca ccaacaccgg cgcccaccat cgcgtcgcag    60
cccctgtccc tgcgcccaga ggcgagccgg ccagcggcgg ggggcgcagt gcacacgagg   120
gggctggact tcgccagtga taagccc                                      147

<210> SEQ ID NO 10
<211> LENGTH: 49
<212> TYPE: PRT
<213> ORGANISM: Homo sapiens

<400> SEQUENCE: 10

Lys Pro Thr Thr Thr Pro Ala Pro Arg Pro Pro Thr Pro Ala Pro Thr
1               5                   10                  15

Ile Ala Ser Gln Pro Leu Ser Leu Arg Pro Glu Ala Ser Arg Pro Ala
            20                  25                  30

Ala Gly Gly Ala Val His Thr Arg Gly Leu Asp Phe Ala Ser Asp Lys
        35                  40                  45

Pro

<210> SEQ ID NO 11
<211> LENGTH: 81
<212> TYPE: DNA
<213> ORGANISM: Homo sapiens

<400> SEQUENCE: 11
ttttgggtgc tggtggtggt tggtggagtc ctggcttgct atagcttgct agtaacagtg    60
gcctttatta ttttctgggt g                                             81

<210> SEQ ID NO 12
<211> LENGTH: 27
<212> TYPE: PRT
<213> ORGANISM: Homo sapiens

<400> SEQUENCE: 12

Phe Trp Val Leu Val Val Val Gly Gly Val Leu Ala Cys Tyr Ser Leu
1               5                   10                  15

Leu Val Thr Val Ala Phe Ile Ile Phe Trp Val
            20                  25

<210> SEQ ID NO 13
<211> LENGTH: 123
<212> TYPE: DNA
<213> ORGANISM: Homo sapiens

<400> SEQUENCE: 13
aggagtaaga ggagcaggct cctgcacagt gactacatga acatgactcc ccgccgcccc    60

```
gggcccaccc gcaagcatta ccagccctat gccccaccac gcgacttcgc agcctatcgc    120
tcc                                                                   123
```

<210> SEQ ID NO 14
<211> LENGTH: 41
<212> TYPE: PRT
<213> ORGANISM: Homo sapiens

<400> SEQUENCE: 14

```
Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
        35                  40
```

<210> SEQ ID NO 15
<211> LENGTH: 345
<212> TYPE: DNA
<213> ORGANISM: Homo sapiens

<400> SEQUENCE: 15

```
agagtgaagt tcagcaggag cgcagacgcc cccgcgtacc agcagggcca gaaccagctc     60
tataacgagc tcaatctagg acgaagagag gagtacgatg ttttggacaa gagacgtggc    120
cgggaccctg agatgggggg aaagccgcag agaaggaaga accctcagga aggcctgtac    180
aatgaactgc agaaagataa gatggcggag gcctacagtg agattgggat gaaaggcgag    240
cgccggaggg gcaaggggca cgatggcctt taccagggtc tcagtacagc caccaaggac    300
acctacgacg cccttcacat gcaggccctg ccccctcgct aatag                   345
```

<210> SEQ ID NO 16
<211> LENGTH: 113
<212> TYPE: PRT
<213> ORGANISM: Homo sapiens

<400> SEQUENCE: 16

```
Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Gln Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
            100                 105                 110

Arg
```

<210> SEQ ID NO 17
<211> LENGTH: 472
<212> TYPE: PRT
<213> ORGANISM: Homo sapiens

<400> SEQUENCE: 17

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Val Met His Trp Val Arg Gln Ala Pro Gly Gln Gly Leu Glu Trp Met
        35                  40                  45

Gly Tyr Ile Ile Pro Tyr Asn Asp Ala Thr Lys Tyr Asn Glu Lys Phe
    50                  55                  60

Lys Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Asn Tyr Asp Gly Tyr Phe Asp Val Trp Gly Gln Gly Thr
            100                 105                 110

Leu Val Thr Val Ser Ser Gly Gly Gly Ser Gly Gly Gly Gly Ser
        115                 120                 125

Gly Gly Gly Gly Ser Asp Val Val Met Thr Gln Ser Pro Ala Phe Leu
    130                 135                 140

Ser Val Thr Pro Gly Glu Lys Val Thr Ile Thr Cys Arg Ala Ser Gln
145                 150                 155                 160

Ser Ile Ser Asp Tyr Leu His Trp Tyr Gln Gln Lys Pro Asp Gln Ala
                165                 170                 175

Pro Lys Leu Leu Ile Lys Tyr Ala Ser Gln Ser Ile Ser Gly Val Pro
            180                 185                 190

Ser Arg Phe Ser Gly Ser Gly Ser Gly Thr Asp Phe Thr Phe Thr Ile
        195                 200                 205

Ser Ser Leu Glu Ala Glu Asp Ala Ala Thr Tyr Tyr Cys Gln Asn Gly
    210                 215                 220

His Ser Phe Pro Pro Thr Phe Gly Gly Gly Thr Lys Val Glu Ile Lys
225                 230                 235                 240

Leu Glu Lys Pro Thr Thr Thr Pro Ala Pro Arg Pro Pro Thr Pro Ala
                245                 250                 255

Pro Thr Ile Ala Ser Gln Pro Leu Ser Leu Arg Pro Glu Ala Ser Arg
            260                 265                 270

Pro Ala Ala Gly Gly Ala Val His Thr Arg Gly Leu Asp Phe Ala Ser
        275                 280                 285

Asp Lys Pro Phe Trp Val Leu Val Val Gly Gly Val Leu Ala Cys
    290                 295                 300

Tyr Ser Leu Leu Val Thr Val Ala Phe Ile Ile Phe Trp Val Arg Ser
305                 310                 315                 320

Lys Arg Ser Arg Leu Leu His Ser Asp Tyr Met Asn Met Thr Pro Arg
                325                 330                 335

Arg Pro Gly Pro Thr Arg Lys His Tyr Gln Pro Tyr Ala Pro Pro Arg
            340                 345                 350

Asp Phe Ala Ala Tyr Arg Ser Arg Val Lys Phe Ser Arg Ser Ala Asp
        355                 360                 365

Ala Pro Ala Tyr Gln Gln Gly Gln Asn Gln Leu Tyr Asn Glu Leu Asn
    370                 375                 380

Leu Gly Arg Arg Glu Glu Tyr Asp Val Leu Asp Lys Arg Arg Gly Arg
385                 390                 395                 400

Asp Pro Glu Met Gly Gly Lys Pro Gln Arg Arg Lys Asn Pro Gln Glu
                405                 410                 415
```

```
Gly Leu Tyr Asn Glu Leu Gln Lys Asp Lys Met Ala Glu Ala Tyr Ser
            420                 425                 430

Glu Ile Gly Met Lys Gly Glu Arg Arg Gly Lys Gly His Asp Gly
        435                 440                 445

Leu Tyr Gln Gly Leu Ser Thr Ala Thr Lys Asp Thr Tyr Asp Ala Leu
    450                 455                 460

His Met Gln Ala Leu Pro Pro Arg
465                 470

<210> SEQ ID NO 18
<211> LENGTH: 126
<212> TYPE: DNA
<213> ORGANISM: Homo sapiens

<400> SEQUENCE: 18 aaacgggca gaaagaaact cctgtatata ttcaaacaac catttatgag accagtacaa     60
actactcaag aggaagatgg ctgtagctgc cgatttccag aagaagaaga aggaggatgt    120
gaactg                                                               126

<210> SEQ ID NO 19
<211> LENGTH: 42
<212> TYPE: PRT
<213> ORGANISM: Homo sapiens

<400> SEQUENCE: 19

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
            35                  40

<210> SEQ ID NO 20
<211> LENGTH: 1491
<212> TYPE: DNA
<213> ORGANISM: Homo sapiens

<400> SEQUENCE: 20
atggccttac cagtgaccgc cttgctcctg ccgctggcct tgctgctcca cgccgccagg     60
ccggctagcc aggtgcagct ggtgcagagc ggcgcggaag tgaaaaaacc gggcgcgagc    120
gtgaaagtga gctgcaaagc gagcggctat accttttacca gctatgtgat gcattgggtg    180
cgccaggcgc cgggccaggg cctggaatgg atgggctata ttattccgta taacgatgcg    240
accaaatata cgaaaaaatt taaaggccgc gtgaccatga cccgcgatac cagcaccagc    300
accgtgtata tggaactgag cagcctgcgc agcgaagata ccgcggtgta ttattgcgcg    360
cgctataact atgatggcta ttttgatgtg tggggccagg gcaccctggt gaccgtgagc    420
agcggcggcg gcggcagcgg cggcggcggc agcggcggcg gcggcagcga tgtggtgatg    480
acccagagcc cggcgtttct gagcgtgacc ccgggcgaaa aagtgaccat acctgccgc    540 gcgagccaga gcattagcga ttatctgcat tggtatcagc agaaaccgga tcaggcgccg    600
aaactgctga ttaaatatgc gagccagagc attagcggcg tgccgagccg ctttagcggc    660
agcggcagcg gcaccgattt tacctttacc attagcagcc tggaagcgga agatgcggcg    720
acctattatt gccagaacgg ccatagcttt ccgccgacct ttggcggcgg caccaaagtg    780
gaaattaaac tcgagaagcc caccacgacg ccagcgccgc gaccaccaac accggcgccc    840
```

```
accatcgcgt cgcagcccct gtccctgcgc ccagaggcga gccggccagc ggcgggggc      900
gcagtgcaca cgagggggct ggacttcgcc agtgataagc cttttgggt gctggtggtg      960
gttggtggag tcctggcttg ctatagcttg ctagtaacag tggcctttat tattttctgg    1020
gtgaaacggg gcagaaagaa actcctgtat atattcaaac aaccatttat gagaccagta    1080
caaactactc aagaggaaga tggctgtagc tgccgatttc agaagaaga agaaggagga     1140
tgtgaactga gagtgaagtt cagcaggagc gcagacgccc ccgcgtacca gcagggccag    1200
aaccagctct ataacgagct caatctagga cgaagagagg agtacgatgt tttggacaag    1260
agacgtggcc gggaccctga gatgggggga aagccgcaga gaaggaagaa ccctcaggaa    1320
ggcctgtaca atgaactgca gaaagataag atggcggagg cctacagtga gattgggatg    1380
aaaggcgagc gccggagggg caaggggcac gatggccttt accagggtct cagtacagcc    1440
accaaggaca cctacgacgc ccttcacatg caggccctgc cccctcgcta a             1491

<210> SEQ ID NO 21
<211> LENGTH: 496
<212> TYPE: PRT
<213> ORGANISM: Homo sapiens

<400> SEQUENCE: 21

Met Ala Leu Pro Val Thr Ala Leu Leu Leu Pro Leu Ala Leu Leu Leu
1               5                   10                  15

His Ala Ala Arg Pro Ala Ser Gln Val Gln Leu Val Gln Ser Gly Ala
            20                  25                  30

Glu Val Lys Lys Pro Gly Ala Ser Val Lys Val Ser Cys Lys Ala Ser
        35                  40                  45

Gly Tyr Thr Phe Thr Ser Tyr Val Met His Trp Val Arg Gln Ala Pro
    50                  55                  60

Gly Gln Gly Leu Glu Trp Met Gly Tyr Ile Ile Pro Tyr Asn Asp Ala
65                  70                  75                  80

Thr Lys Tyr Asn Glu Lys Phe Lys Gly Arg Val Thr Met Thr Arg Asp
                85                  90                  95

Thr Ser Thr Ser Thr Val Tyr Met Glu Leu Ser Ser Leu Arg Ser Glu
            100                 105                 110

Asp Thr Ala Val Tyr Tyr Cys Ala Arg Tyr Asn Tyr Asp Gly Tyr Phe
        115                 120                 125

Asp Val Trp Gly Gln Gly Thr Leu Val Thr Val Ser Ser Gly Gly Gly
    130                 135                 140

Gly Ser Gly Gly Gly Gly Ser Gly Gly Gly Gly Ser Asp Val Val Met
145                 150                 155                 160

Thr Gln Ser Pro Ala Phe Leu Ser Val Thr Pro Gly Glu Lys Val Thr
                165                 170                 175

Ile Thr Cys Arg Ala Ser Gln Ser Ile Ser Asp Tyr Leu His Trp Tyr
            180                 185                 190

Gln Gln Lys Pro Asp Gln Ala Pro Lys Leu Leu Ile Lys Tyr Ala Ser
        195                 200                 205

Gln Ser Ile Ser Gly Val Pro Ser Arg Phe Ser Gly Ser Gly Ser Gly
    210                 215                 220

Thr Asp Phe Thr Phe Thr Ile Ser Ser Leu Glu Ala Glu Asp Ala Ala
225                 230                 235                 240

Thr Tyr Tyr Cys Gln Asn Gly His Ser Phe Pro Pro Thr Phe Gly Gly
                245                 250                 255
```

-continued

```
Gly Thr Lys Val Glu Ile Lys Leu Glu Lys Pro Thr Thr Thr Pro Ala
            260             265             270

Pro Arg Pro Pro Thr Pro Ala Pro Thr Ile Ala Ser Gln Pro Leu Ser
        275             280             285

Leu Arg Pro Glu Ala Ser Arg Pro Ala Ala Gly Gly Ala Val His Thr
    290             295             300

Arg Gly Leu Asp Phe Ala Ser Asp Lys Pro Phe Trp Val Leu Val Val
305             310             315                         320

Val Gly Gly Val Leu Ala Cys Tyr Ser Leu Leu Val Thr Val Ala Phe
                325             330             335

Ile Ile Phe Trp Val Lys Arg Gly Arg Lys Lys Leu Leu Tyr Ile Phe
            340             345             350

Lys Gln Pro Phe Met Arg Pro Val Gln Thr Thr Gln Glu Glu Asp Gly
            355             360             365

Cys Ser Cys Arg Phe Pro Glu Glu Glu Gly Gly Cys Glu Leu Arg
    370             375             380

Val Lys Phe Ser Arg Ser Ala Asp Ala Pro Ala Tyr Gln Gln Gly Gln
385             390             395                         400

Asn Gln Leu Tyr Asn Glu Leu Asn Leu Gly Arg Arg Glu Glu Tyr Asp
            405             410             415

Val Leu Asp Lys Arg Arg Gly Arg Asp Pro Glu Met Gly Gly Lys Pro
            420             425             430

Gln Arg Arg Lys Asn Pro Gln Glu Gly Leu Tyr Asn Glu Leu Gln Lys
        435             440             445

Asp Lys Met Ala Glu Ala Tyr Ser Glu Ile Gly Met Lys Gly Glu Arg
    450             455             460

Arg Arg Gly Lys Gly His Asp Gly Leu Tyr Gln Gly Leu Ser Thr Ala
465             470             475                         480

Thr Lys Asp Thr Tyr Asp Ala Leu His Met Gln Ala Leu Pro Pro Arg
            485             490             495
```